United States Patent
Norrefeldt et al.

(10) Patent No.: US 12,312,090 B2
(45) Date of Patent: May 27, 2025

(54) REDUCING CONDENSATE PRECIPITATE ON INNER SURFACES OF AN OUTER SKIN OF AN AIRCRAFT

(71) Applicant: Fraunhofer-Gesellschaft zur Förderung der angewandten Forschung e.V., Munich (DE)

(72) Inventors: Victor Norrefeldt, Valley (DE); Arnav Pathak, Valley (DE); Gerhard Riedl, Valley (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 18/068,658

(22) Filed: Dec. 20, 2022

(65) Prior Publication Data
US 2023/0234711 A1    Jul. 27, 2023

(51) Int. Cl.
  *B64D 13/06* (2006.01)
  *B64C 1/06* (2006.01)

(52) U.S. Cl.
  CPC ........... *B64D 13/06* (2013.01); *B64C 1/067* (2013.01); *B64D 2013/0662* (2013.01)

(58) Field of Classification Search
  CPC .. B64D 2013/0662; B64D 13/06; B64C 1/067
  See application file for complete search history.

(56) References Cited

U.S. PATENT DOCUMENTS

| | | | |
|---|---|---|---|
| 5,386,952 A * | 2/1995 | Nordstrom | B64D 13/00 244/118.1 |
| 6,491,254 B1 | 12/2002 | Walkinshaw et al. | |
| 2011/0009042 A1 | 1/2011 | Joern | |
| 2012/0199315 A1 | 8/2012 | Barreau et al. | |
| 2019/0291873 A1* | 9/2019 | Connell | B64D 13/06 |
| 2021/0122476 A1* | 4/2021 | Trent | B64D 13/08 |

(Continued)

FOREIGN PATENT DOCUMENTS

WO   WO 00/37313   6/2000

OTHER PUBLICATIONS

Extended European Search Report received for EP Application No. 21 216 430.5 mailed May 20, 2022 (7 pages).

(Continued)

*Primary Examiner* — Tye William Abell
*Assistant Examiner* — Justin Michael Heston
(74) *Attorney, Agent, or Firm* — Hussey IP, LLC

(57) ABSTRACT

The embodiments relate to reducing condensate precipitate on inner surfaces of an outer skin of an aircraft and adjacent components. The condensate precipitate is reduced by supplying dry air to an upper region of an air gap which extends between the upper region and a lower region and is disposed between the outer skin of an aircraft and an insulation arranged between a cabin wall and the outer skin of an aircraft. The dry air may be obtained with low effort and at low cost by sucking it off from the lower region of the air gap and conducted in one or more lines to the upper region of the air gap, where it is allowed to re-enter the air gap. The lines are connected to fans which create a pressure difference in the lines, which moves the dry air from the inlet opening or openings to the outlet openings.

16 Claims, 3 Drawing Sheets

(56) References Cited

U.S. PATENT DOCUMENTS

2021/0339872 A1  11/2021  Hill et al.

OTHER PUBLICATIONS

Huber et al., "Controlling Nuisance Moisture in Commercial Airplanes," Aero Magazine, http://www.boeing.com/commercial/aeromagazine/aero_05/textonly/m01txt.html, Jan. 1999 (13 pp.).

Mario Wörner, "Wärme und Stofftransport in einer Flugzeugkabine unter besonderer Berücksichtigung des Feuchtetransports," ISBN 978-3-86727-053-3, in German language (124 pp.) (due to size limits, article is broken down into four parts).

Walkinshaw, Douglas S. et al., "Controlling Cabin and Envelope Air Flows and Pressure Differentials to Prevent Envelope Condensation, Enable Cabin Humidification, Improve Fire Safety, and Decrease Fuel Use,". SAE International Journal of Aerospace, vol. 4 Issue 2 (2011) 1243-1253 (14 pp.).

Walkinshaw, Douglas S. et al., "Stack Pressure-Created Airflows in Insulation Envelopes, Part 2, Passenger Aircraft: Another HVAC Design Parameter to Consider," ASHRAE Journal, vol. 62, Issue 5, May 2020 (16 pp.).

\* cited by examiner

REDUCING CONDENSATE PRECIPITATE ON INNER SURFACES OF AN OUTER SKIN OF AN AIRCRAFT

CROSS-REFERENCE TO RELATED APPLICATIONS

This application claims priority under 35 USC § 119 to European Patent Application No. 21 216 430.5, filed Dec. 21, 2021, which is hereby incorporated by reference.

FIELD OF THE INVENTION

The embodiments relate to reducing condensate precipitate on inner surfaces of an outer skin of an aircraft and adjacent components.

DESCRIPTION OF THE PRIOR ART

A method of this type and a device for carrying out this method are known from U.S. Pat. No. 6,491,254 B1. In this publication, the dry air supplied to the air gap between the outer skin of the aircraft and the insulation is branched off from an air stream processed in an air conditioning system, the other part of which is supplied to the cabin, the air processed in the air conditioning system being bleed air from a compressor of an aircraft engine. The dry air supplied to the air gap between the outer skin of an aircraft and the insulation is supplied to the air gap via lines connected to the air conditioning system and flow control valves and a plurality of air outlet nozzles arranged in the air gap in distributed fashion, an air pressure which is higher than the air pressure prevailing in the cabin forming in the air gap during cruise flight and which prevents an overflow of cabin air, caused by the stack effect, through the insulation into the air gap. The use of compressor bleed air and its processing in an air conditioning system which also supplies air to the cabin in order to obtain the dry air to be supplied to the air gap, requires an increased power of the air conditioning system, a higher weight and higher cost of the air conditioning system as a result of the required increase in power, and thus a higher energy consumption of the aircraft.

In a method known from U.S. Pat. No. 5,386,952 for reducing condensate precipitate on inner surfaces of an outer skin of an aircraft and adjacent components, cabin air is taken in near the floor by means of a plurality of air dehumidifiers distributed near the floor in the aircraft cabin, dehumidified and heated, and then blown into the air gap between the outer skin of the aircraft and the insulation at locations near the floor that are distributed in the longitudinal direction of the aircraft. The dry and heated air from the cabin that is blown into the air gap is distributed in the air gap and has a higher pressure than the air pressure prevailing in the cabin. As a result, air from the air gap enters the cabin again through the insulation. Although this also prevents condensation precipitate and the resulting formation of ice on the cold surfaces of the outer skin of the aircraft and the adjacent components that confine the air gap, the use of apparatus for dehumidifying and heating cabin air to obtain the dry air introduced into the air gap takes up additional space in the aircraft, increases the weight of the aircraft, and increases its power consumption as well as purchase and operating costs so that the advantages gained by avoiding condensate and ice formation in the air gap are offset by the disadvantages associated with the use of air dehumidifiers to obtain dry air for introduction into the air gap.

Furthermore, US 2021/0122476 A1 discloses a method for reducing condensate precipitate on the inner surfaces of an outer skin of an aircraft and adjacent components, in which dry air processed in an air conditioning system is blown through lines and controllable valves into a space above the cabin ceiling (crown region), air processed in this or a separate air conditioning system being blown out of these lines or separate lines simultaneously or also in alternation to the air blown into the upper space as cabin air into the cabin. Thus, in this method as well, the dry air blown into the space above the cabin ceiling is provided by an air conditioning system, which in turn is supplied with compressor bleed air. The collection of the cabin air, which has a higher temperature and a higher humidity than the dry air blown into the space above the cabin ceiling, by means of the same air conditioning system or a separate air conditioning system requires a high effort in terms of equipment and control technology, which leads to additional costs and also an additional weight so that the advantage gained by the avoidance of an additional dehumidifier specifically used for obtaining the dry air is offset by the disadvantage associated with the additional effort in terms of equipment and control technology.

BRIEF DESCRIPTION OF THE DRAWING

The accompanying figure, where like reference numerals refer to identical or functionally similar elements, which are not true to scale, and which, together with the detailed description below, are incorporated in and form part of the specification, serve to illustrate further various embodiments and to explain various principles and advantages all in accordance with the devices, apparatuses, and methods. Advantages of embodiments of the systems, apparatuses, and methods will be apparent from the following detailed description of the example embodiments thereof, which description should be considered in conjunction with the accompanying drawings in which.

DETAILED DESCRIPTION

Figure 1:
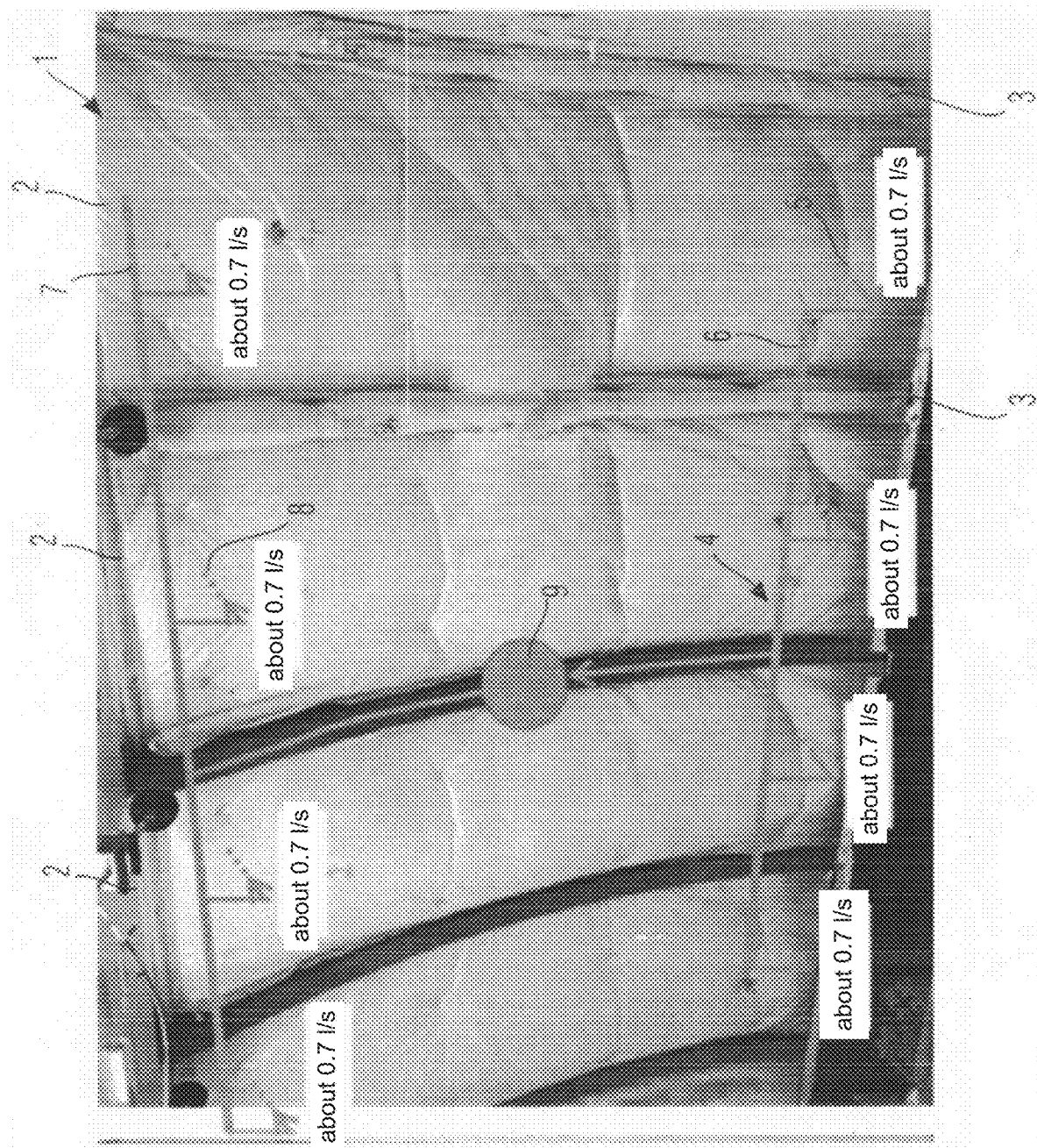
FIG. 1 illustrates an example embodiment.

The condensate precipitate is reduced by supplying dry air to an upper region of an air gap which extends between the upper region and a lower region and is located between the outer skin of an aircraft and an insulation which is disposed between a cabin wall and the outer skin of an aircraft. The embodiments also describe a device for carrying out this method.

As required, detailed embodiments of the devices, products, apparatuses, and methods are disclosed herein; however, it is to be understood that the disclosed embodiments are merely exemplary of the devices, products, apparatuses, and methods which can be embodied in various forms. Therefore, specific structural and functional details disclosed herein are not to be interpreted as limiting, but merely as a basis for the claims and as a representative basis for teaching one skilled in the art to variously employ the devices, products, apparatuses, and methods in virtually any appropriately detailed structure. Further, the terms and phrases used herein are not intended to be limiting; but rather, to provide an understandable description of the devices, products, apparatuses, and methods. While the specification concludes with claims defining the features of the devices, products, apparatuses, and methods that are regarded as novel, it is believed that the devices, products, apparatuses, and methods will be better understood from a consideration of the following description in conjunction with the drawing figures, in which like reference numerals are carried forward.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Alternate embodiments may be devised without departing from the spirit or the scope of the invention. Additionally, well-known elements of exemplary embodiments of the devices, products, apparatuses, and methods will not be described in detail or will be omitted so as not to obscure the relevant details of the systems, apparatuses, and methods.

Before the devices, products, apparatuses, and methods are disclosed and described, it is to be understood that the terminology used herein is for the purpose of describing particular embodiments only and is not intended to be limiting. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element. The terms "including" and/or "having," as used herein, are defined as comprising (i.e., open language). The terms "a" or "an", as used herein, are defined as one or more than one. The term "plurality," as used herein, is defined as two or more than two. The term "another," as used herein, is defined as at least a second or more. The description may use the terms "embodiment" or "embodiments," which may each refer to one or more of the same or different embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact (e.g., directly coupled). However, "coupled" may also mean that two or more elements are not in direct contact with each other, but yet still cooperate or interact with each other (e.g., indirectly coupled).

For the purposes of the description, a phrase in the form "A/B" or in the form "A and/or B" or in the form "at least one of A and B" means (A), (B), or (A and B), where A and B are variables indicating a particular object or attribute. When used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables, for example, a phrase in the form "at least one of A, B, and C" means (A), (B), (C), (A and B), (A and C), (B and C), or (A, B and C).

Relational terms such as first and second, top and bottom, and the like may be used solely to distinguish one entity or action from another entity or action without necessarily requiring or implying any actual such relationship or order between such entities or actions. The description may use perspective-based descriptions such as up/down, back/front, top/bottom, and proximal/distal. Such descriptions are merely used to facilitate the discussion and are not intended to restrict the application of disclosed embodiments. Various operations may be described as multiple discrete operations in turn, in a manner that may be helpful in understanding embodiments; however, the order of description should not be construed to imply that these operations are order dependent.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. As used herein, the terms "substantial" and "substantially" means, when comparing various parts to one another, that the parts being compared are equal to or are so close enough in dimension that one skill in the art would consider the same. Substantial and substantially, as used herein, are not limited to a single dimension and specifically include a range of values for those parts being compared. The range of values, both above and below (e.g., "+/−" or greater/lesser or larger/smaller), includes a variance that one skilled in the art would know to be a reasonable tolerance for the parts mentioned.

It is an object of the invention to improve a method for reducing condensation precipitate on inner surfaces of the outer skin of an aircraft and neighboring components in such a way that the dry air which enters the upper region of the air gap which extends between the upper region and a lower region and which is located between the outer skin of an aircraft and an insulation which is arranged between the cabin wall and the outer skin of the aircraft, is obtained at a lower cost in terms of equipment and energy than before, it being possible to take into account the method not only in the construction of new aircraft but also in the retrofitting of existing aircraft. Furthermore, a device for carrying out this method shall be provided.

The invention is based on the observation that, in flight, warm and moist air flows from the cabin through the cabin wall, which is not air-tight, and the air-permeable insulation into the upper region of the air gap because there is a temperature gradient between the cabin and the upper region of the air gap, which gradient leads to a thermally induced pressure difference that causes this air stream. Typically, this air flowing into the air gap has a temperature of about 20° C. and a relative humidity RH of about 10%. During flight, low outside temperatures prevail, which also cause the outer skin of the aircraft and adjacent components behind the insulation to become cold. The air flowed into the air gap also cools down. Since cold air has a higher density, it flows downwards behind the insulation, where it would leave the insulation again if it were not sucked off according to the invention. The air flowing downwards behind the insulation is dry because it has been dehumidified by condensation on the cold outer skin of the aircraft and the cold adjacent components. The inventive concept is to suck off this air in the lower region of the air gap and to blow it back in at the top, particularly at points to be protected, thus creating a circulation of dry air. The lower region of the air gap, where the dry air is sucked off, represents a "free" or at least "cheap" source of dry air.

An advantage of the method according to the invention is that the use of the outer skin of an aircraft as a dehumidification unit and the extraction of air dehumidified in this way are more energy-efficient than the known solutions in which the air is actively dehumidified or fresh bleed air from the engine is used.

The use of one or more fans in the device according to the invention for carrying out the method is advantageous because a fan typically requires only a few watts, while dehumidification by a machine is associated with a high effort due to the phase change and the already relatively dry cabin air, which has a relative humidity of about 10% RH. Fresh air from outside, which has a temperature of about −50° C., is also an "expensive" source of dry air since it must first be compressed to cabin pressure and then conditioned.

By reducing the condensate precipitate on the cold outer skin of the aircraft and the adjacent cold components, which is caused by the method according to the invention, the risk of ice formation, which melts when the outer skin of the aircraft and adjacent components warm up again and becomes water that can drip uncontrollably into the cabin and onto the passengers (keyword: "rain in the plane"), is also reduced.

Figure 2:
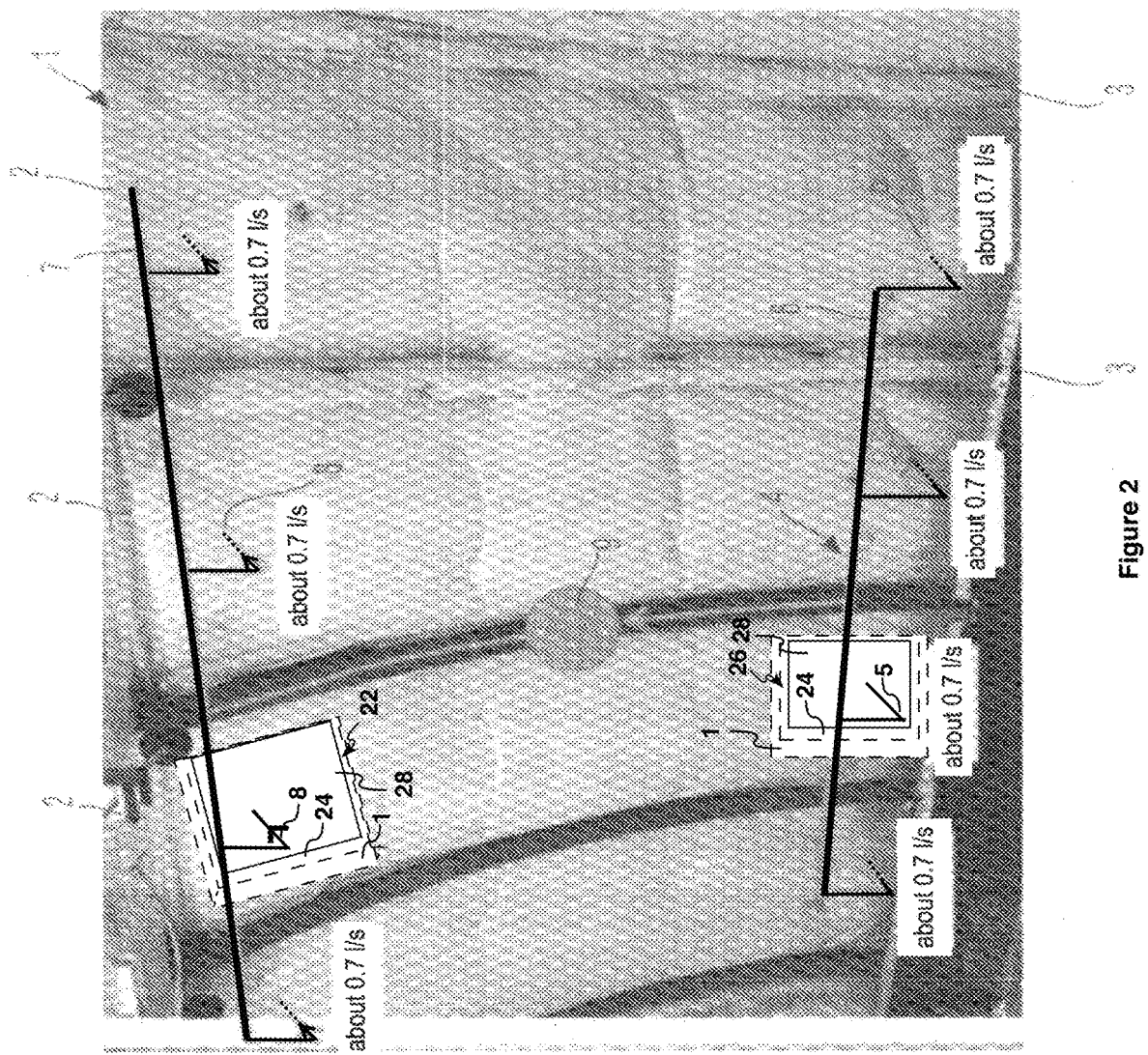
FIG. 2 is the same as FIG. 1 except that FIG. 2 shows two portions of the insulation 1 removed thereby exposing an upper region of the air gap and a lower region of the air gap, respectively.

An example embodiment is schematically shown in FIGS. 1 and 2 and is described in more detail below with reference to FIGS. 1 and 2, FIGS. 1 and 2 showing a top view of a section of the insulation with the cabin wall removed from the cabin.

Figure 3:
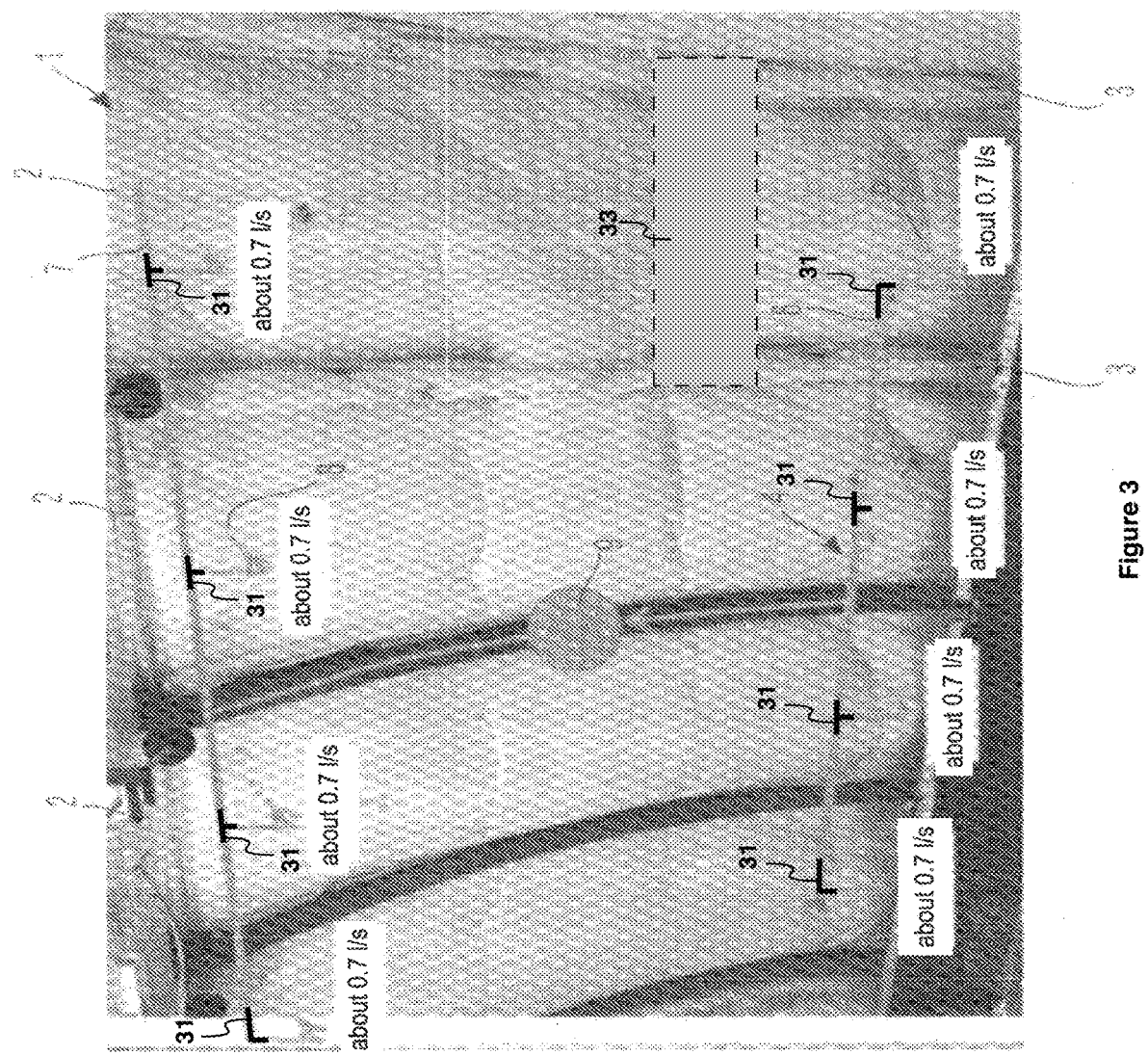
FIG. 3 schematically illustrates an embodiment having multiple-way valves 31 and shows a rectangular portion of the cabin wall.

As shown in FIG. 1, an insulation 1 in the form of a mat is located in the frame fields 2 between adjacent frames 3 of an aircraft not shown in detail. The insulation is arranged between the cabin wall, which is not shown in FIGS. 1 and 2, and the outer skin of the aircraft, which is not visible in FIG. 1, an air gap being formed between the insulation 1 and the outer skin of the aircraft, which air gap is also adjoined by other components adjacent to the outer skin of the aircraft, such as the frames 3. The air gap is not visible in FIG. 1 but is visible in FIG. 2. FIG. 2 is the same as FIG. 1 except that FIG. 2 shows two portions of the insulation 1 removed thereby exposing an upper region 22 of the air gap 24 and a lower region 26 of the air gap 24, respectively, in addition to exposing two portions of the outer skin 28 of the aircraft. A schematically illustrated line network 4 consisting of a plurality of line sections in the form of hoses is used to convey dry air from a lower region 26 of the air gap 24 to the upper region 22 of the air gap 24. The line network 4 has a plurality of first line sections 5, which are led through passages in the insulation 1 to the lower region 26 of the air gap 24 where they have air inlet openings (not shown). The line network 4 also has second line sections, which include a collection line 6 and a distribution line 7. FIG. 3 schematically illustrates an embodiment in which first line sections 5 are connected to the collection line 6 via multiple-way valves 31, and the distribution line 7 is connected to a plurality of third line sections 8 via multiple-way valves 31, each of which is led through passages in the insulation 1 to the upper region 22 of the air gap 24, where they have air outlet openings (not shown). An intermittently operable fan 9 is connected with its inlet side to the collection line 6 and is connected with its outlet side to the distribution line 7. The line network 4 is largely located in the space between the insulation 1 and the cabin wall 33, a rectangular portion of which is shown in FIG. 3. The fan 9 is also located there. Alternatively, however, it could also be arranged in a space above the cabin ceiling due to space restrictions. In each case, a first line section 5 and a third line section 8 are arranged in each frame field 2. Alternatively, the arrangement of the first and third line sections 5, 8 in relation to the frame fields 2 can also be made differently, for example due to place restrictions or for reasons of sucking off or blowing in air more effectively.

When the fan 9 is switched on, it generates a pressure difference in the line network 4, which causes dry air in the lower region 26 of the air gap 24 to be sucked into the inlet openings of the first line sections 5 and moved via the collection line 6 and the distribution line 7 to the third line sections 8, where it is blown in again via their outlet openings into the upper region 22 of the air gap 24. Instead of one fan 9, it is also possible to use a plurality of fans, if required.

The fan or fans is or are switched off and on depending on the temperature. For example, the fan or fans is or are turned on when the outside temperature drops below about −7° C. or about −9° C. or about −5° C. in flight, for example.

In tests, it was found that the leakage flow behind the insulation plane, i.e. past the cold outer skin 28 of the aircraft, is about 0.7 to 1.4 l/s per frame field. To prevent the overflow of warm-moist cabin air behind the insulation plane, about this amount of alternative air had to be applied, with somewhat more or less being required, of course, depending on the tightness of the cabin wall 33.

It was also found that the condensation problem only occurs when the temperature of the outer skin 28 falls below the dew point of the cabin air. The air in the cabin typically has 10-15% relative humidity at 23° C. in flight. This corresponds to a dew point temperature of about −7° C. Only below this temperature should the air circulation system be activated. In the simplest case, the control can be performed with an on/off switch, which activates the system with a fixed volumetric flow when the temperature falls below a limit temperature.

The foregoing description and accompanying drawings illustrate the principles, example embodiments, and modes of operation of the systems, apparatuses, and methods. However, the systems, apparatuses, and methods should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments may be made by those skilled in the art without departing from the scope of the systems, apparatuses, and methods as defined by the following claims.

What is claimed is:

1. A method for reducing condensate precipitate on inner surfaces of an outer skin of an aircraft, the method comprising:
   supplying dry air into an upper region of an air gap which has the upper region and a lower region and is disposed between the outer skin of an aircraft and an insulation, wherein the insulation is disposed inside the fuselage between a cabin wall and the outer skin of an aircraft;
   obtaining the dry air by pulling the dry air from the lower region of the air gap and supplying the dry air to one or more lines to the upper region of the air gap, where the dry air re-enters the air gap; and
   reducing the condensate precipitate by the supplied dry air.

2. The method according to claim 1, wherein the dry air is pulled from a plurality of outlet points of the lower region of the air gap that are spaced in the longitudinal direction of the aircraft and is allowed to re-enter the upper region of the air gap at a plurality of inlet points thereof that are spaced in the longitudinal direction of the aircraft, wherein the dry air is guided between the outlet and inlet points through a network of lines comprising the plurality of lines, where a pressure difference is generated which moves the dry air from the outlet points to the inlet points.

3. The method according to claim 2, wherein a volumetric flow of dry air in the range between 0.7 l/s and 1.4 l/s is pulled from the air gap at each outlet point or wherein a volumetric flow of dry air in the range between about 0.7 l/s and about 1.4 l/s enters the air gap at each inlet point.

4. The method according to claim 1, wherein the dry air is pulled from the lower region of the air gap or the dry air is supplied to the upper region of the air gap intermittently.

5. The method according to claim 1, wherein the dry air is supplied to the upper region of the air gap after the air surrounding the outer skin of the aircraft reaches a predetermined outside temperature.

6. The method according to claim 1, wherein the dry air is supplied to the upper region of the air gap after the air surrounding the outer skin of the aircraft reaches a predetermined temperature of 0° C. or less.

7. An aircraft comprising:
a fuselage having an outer skin;
an insulation disposed inside the fuselage between a cabin wall and the outer skin;
an air gap disposed between the outer skin and the insulation, wherein the air gap has an upper region and a lower region; and,
one or more lines configured to supply dry air through one or more outlet openings of the one or more lines to the upper region of the air gap,
wherein the one or more lines has one or more inlet openings at the lower region of the air gap, further wherein the inlet openings are configured to pull dry air in the lower region of the air gap, and the one or more lines is connected to one or more fans which, generate a pressure difference in the one or more lines which moves the dry air from the inlet openings to the outlet openings.

8. The aircraft according to claim 7, wherein the inlet openings are located at first line sections extending below the insulation or in passages in the insulation between the air gap and a space between the insulation and the cabin wall, and are connected to second line sections arranged in the space between the insulation and the cabin wall.

9. The aircraft according to claim 8, wherein the outlet openings are located at third line sections which run above the insulation or in further passages in the insulation between the space between the cabin wall and the insulation and the air gap and are connected to the second line sections.

10. The aircraft according to claim 8, wherein the second line sections are connected to the first line sections via first valves or wherein the second line sections are connected to the third line sections via second valves.

11. The aircraft according to claim 10, wherein the first valves and/or the second valves are each multiple-way valves.

12. The aircraft according to claim 8, wherein the second line sections have a distribution line which is connected to the third line sections.

13. The aircraft according to claim 12, wherein the distribution line is connected to the outlet side of a fan and a collection line is connected to the inlet side of the fan.

14. The aircraft according to claim 8, wherein the second line sections have a collection line which is connected to the first line sections.

15. The aircraft according to claim 7, wherein the one or more fans are configured to operate intermittently.

16. The aircraft according to claim 7, wherein each inlet opening and each outlet opening is respectively disposed in a region between two frames.

* * * * *